United States Patent [19]

Yoshimura et al.

[11] Patent Number: 4,849,833
[45] Date of Patent: Jul. 18, 1989

[54] IMAGE SIGNAL RECORDING APPARATUS

[75] Inventors: Katsuji Yoshimura; Toshiyuki Masui; Chikara Sato; Tadayoshi Nakayama, all of Kanagawa, Japan

[73] Assignee: Canon Kabushiki Kaisha, Tokyo, Japan

[21] Appl. No.: 78,217

[22] Filed: Jul. 27, 1987

[30] Foreign Application Priority Data

Jul. 30, 1986 [JP] Japan .................................. 61-177691

[51] Int. Cl.$^4$ ............................................. H04N 5/78
[52] U.S. Cl. ...................................... 360/36.2; 360/9.1; 360/19.1; 360/38.1; 358/343
[58] Field of Search .................... 360/9.1, 18, 19.1, 32, 360/36.2, 38.1; 358/343

[56] References Cited

U.S. PATENT DOCUMENTS 4,353,098 10/1982 Heinz et al. ........................... 360/9.1
4,398,219 8/1983 Yasuda ............................. 360/38.1 X
4,542,419 9/1985 Morio et al. ......................... 360/19.1
4,665,444 5/1987 van der Werf et al. ........... 360/32 X Primary Examiner—David Mis
Attorney, Agent, or Firm—Robin, Blecker & Daley

[57] ABSTRACT

An image signal recording apparatus of the kind handling and recording on a recording medium an image signal which corresponds to a still image consisting of a plurality of horizontal scanning lines and which consists of a plurality of horizontal scanning line information signals corresponding to the horizontal scanning lines is arranged to receive the image signal by the unit of the horizontal scanning line information signal; to obtain horizontal scanning line information data by digitizing the horizontal scanning line information signals; and to form an n number (n: an integer which is at least one) of recording tracks on the recording medium by recording on the medium the horizontal scanning line information data which corresponds to an m number (m: an integer which can be expressed as $1 \leq m \leq 10$) of horizontal scanning lines.

18 Claims, 9 Drawing Sheets

IMAGE SIGNAL RECORDING APPARATUS

BACKGROUND OF THE INVENTION

1. Field of the Invention

This invention relates to an image signal recording apparatus for recording an image signal.

2. Description of the Related Art

In recording an image signal, for example, on a magnetic recording medium such as a magnetic tape, a drop-out phenomenon in which the amount of a signal reproduced by a reproducing magnetic head might suddenly and temporarily decrease due to momentary detachment of the head from the magnetic tape, which takes place at a protrudent or recessed part of the tape surface brought about by some reason. In that event, it has been practiced to compensate for the drop-out, for example, by interpolating the drop-out part of the reproduced signal with a part of the signal which has been reproduced one horizontal scanning period before the drop-out part when the drop-out is detected during a reproducing operation by means of a drop-out detector or the like.

However, in the image signal recording apparatus and particularly in the case of a recording apparatus of the kind recording, on such a recording medium as a magnetic tape or the like, still image data digitized by pulse code modulation (hereinafter referred to as PCM), the above stated conventional drop-out compensating method has necessitated a complex arithmetic operation resulting in a complicated drop-out compensation arrangement, which has hindered cost reducing efforts.

SUMMARY OF THE INVENTION

It is a general object of this invention to solve the above stated problem of the prior art.

It is a more specific object of this invention to provide an image signal recording apparatus which is capable of recording, on a recording medium, an image signal in such a form that permits drop-out compensation for the signal by a simple process in the event of occurrence of a drop-out in the signal during reproduction.

Under this object, an image signal recording apparatus of the kind handling and recording on a recording medium an image signal which corresponds to a still image consisting of a plurality of horizontal scanning lines and consists of a plurality of horizontal scanning line information signals corresponding to the horizontal scanning lines is arranged according to this invention as an embodiment thereof to comprise: converting means which is arranged to receive the image signal by the unit of horizontal scanning line information signal, to digitize the horizontal scanning line information signal and to produce the digitized signal as horizontal scanning line information data; and recording means arranged to form an n number (n: an integer which is at least one) of recording tracks on the recording medium by recording on the medium the horizontal scanning line information data which corresponds to an m number (m: an integer which can be expressed as $1 \leq m \leq 10$) of horizontal scanning lines and is produced from the converting means.

It is another object of this invention to provide a recording apparatus which is capable of selectively recording a digitized still image signal and a digitized audio signal.

Under that object, an image signal recording apparatus of the kind handling and selectively recording on a recording medium an image signal or a digitized audio signal, the image signal corresponding to a still image consisting of a plurality of horizontal scanning lines and consisting of a plurality of horizontal scanning line information signals which correspond to the horizontal scanning lines, the recording apparatus being arranged according to this invention as an embodiment thereof to comprise: converting means which is arranged to receive the image signal by the unit of horizontal scanning line information signal, to digitize the horizontal scanning line information signals and to produce the digitized signals as horizontal scanning line information data; recording means arranged to form a recording track on the recording medium by recording on the medium either the horizontal scanning line information data which corresponds to an m number (m: an integer which can be expressed as $1 \leq m \leq 10$) of horizontal scanning lines and is produced from the converting means or the digitized audio signal; and supply means for supplying the recording means selectively with the horizontal scanning line information data which corresponds to the m number of horizontal scanning lines and is produced from the converting means or with the digitized audio signal.

It is a further object of this invention to provide an image signal recording and/or reproducing apparatus which is capable of correcting information data to make inconspicuous any adverse effect of data error even in the event of occurrence of an uncorrectable error in information data reproduced from a recording medium during a reproducing operation.

Under that object, an image signal recording and/or reproducing apparatus of the kind handling, recording and/or reproducing, on or from a recording medium, an image signal which corresponds to a still image consisting of a plurality of horizontal scanning lines and which consists of a plurality of horizontal scanning line information signals corresponding to the horizontal scanning lines, the recording apparatus being arranged according to this invention as an embodiment thereof to comprise: converting means which is arranged to receive the image signal by the unit of horizontal scanning line information signal, to digitize the horizontal scanning line information signals and to produce the digitized signal as horizontal scanning line information data; recording means arranged to form an n number (n: an integer which is at least one) of recording tracks on the recording medium by recording on the medium the horizontal scanning line information data which corresponds to an m number (m: an integer which can be expressed as $1 \leq m \leq 10$) of horizontal scanning lines and is produced from the converting means; reproducing means for reproducing from the recording medium the horizontal scanning line information data recorded on the medium; error rate detecting means arranged to detect whether or not each portion of the horizontal scanning line information data which corresponds to one horizontal scanning line and is reproduced by the reproducing means has an error rate reaching a predetermined error rate; storing means for storing every horizontal scanning line portion of the horizontal scanning line information data reproduced by the reproducing means; output means arranged such that, when the error rate of the horizontal scanning line portion of the horizontal scanning line information data reproduced by the reproducing means is detected and determined by the error rate detecting means as to have reached the predetermined rate of error, the output means produces a previous horizontal scanning line information data portion which is stored at the storing means and has a lesser rate of error than the predetermined rate; error correcting means arranged to correct the horizontal scanning line information data produced from the output means and to produce the corrected data; and restoring means arranged to reproduce the image sgnal in its original state from the horizontal scanning line information data produced from the error correcting means.

The above and other objects and features of the invention will become apparent from the following detailed description of embodiments thereof taken in connection with the accompanying drawings.

DETAILED DESCRIPTION OF THE PREFERRED EMBODIMENTS

The following description shows the details of this invention through preferred embodiments thereof When a composite television signal of the NTSC color system is sampled, for example, at a frequency of 4 fsc (fsc: color subcarrier frequency), one horizontal scanning line portion of the signal includes 910 sampling points. In the case of the recording format of an 8 mm video tape recorder, among other video tape recorders, for example, each recording track includes a PCM area which is provided for recording an audio PCM signal. The PCM area permits recording therein 1050 words (1050×8 bits) and is large enough for recording a signal obtained by 8-bit quantizing the 910 sampling points of one horizontal scanning line. Therefore, an embodiment of this invention is arranged to simplify a drop-out processing operation, etc. by recording one horizontal scanning line portion of still image data in one track.

Figure 1A:
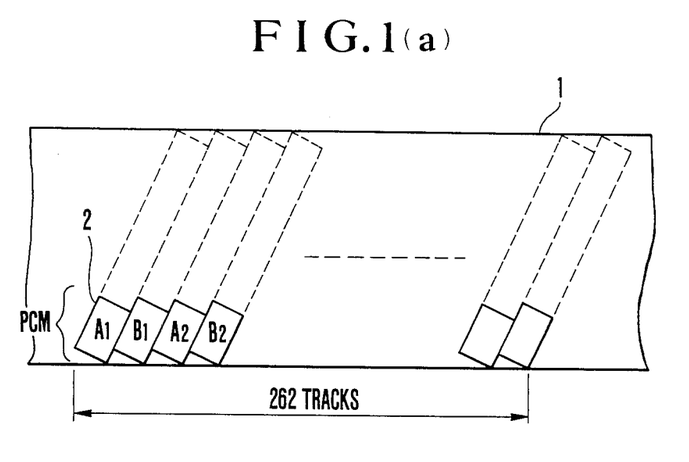
FIGS. 1(a), 1(b) and 1(c) show the principle on which a digital still image signal is recorded according to this invention.
Figure 1B:
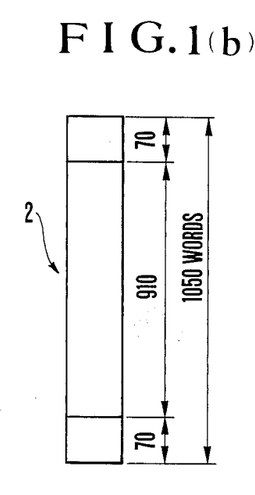
Figure 1C:
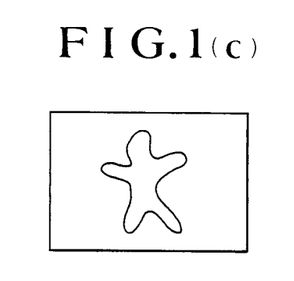
Figure 2:
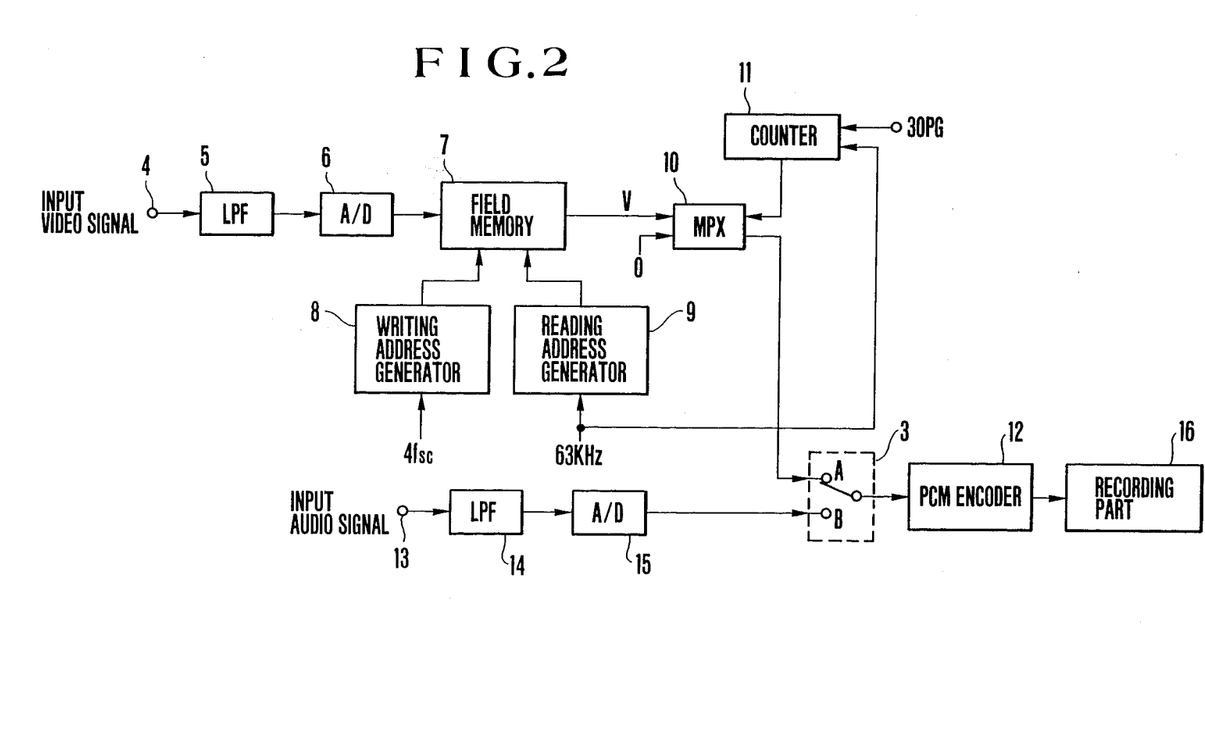
FIG. 2 is a block diagram showing a recording circuit arranged as a first embodiment of this invention.

FIGS. 1(a) to 1(c) show the principle on which a digital still image signal is recorded according to this invention. FIG. 1(a) shows a track pattern which is obtained on a magnetic tape 1 when the digital still image signal is recorded there. As mentioned above, one horizontal scanning line portion of still image data is recorded in each of tracks 2 on the magnetic tape 1. Two rotary magnetic heads are arranged to alternately record the still image data in the PCM areas of the tracks. FIG. 1(b) shows the arrangement of the PCM area in each track 2. With one horizontal scanning line portion of still image data (910 words) recorded within one track (1050 words), there obtains a vacant area corresponding to 140 words (70×2=140). Data representing "0" is recorded in all the vacant areas. One field portion of still image is digitally recorded by recording the data in 265 tracks in the above stated manner. A first embodiment of this invention which is based on this principle is described below with reference to FIG. 2:

FIG. 2 shows in a block diagram a recording circuit arranged as the first embodiment of this invention. Referring to FIG. 2, a switch circuit 3 is arranged to select either a digital still image signal recording circuit system A or a PCM audio signal recording circuit system B. When the contact point of the switch circuit 3 is connected to one side thereof for the digital still image signal recording system, a video signal which comes via an input terminal 4 is supplied to a low-pass filter (hereinafter referred to as LPF) 5 to have its band limited there. The video signal is then supplied to an analog-to-digital (hereinafter referred to as A/D) converter 6. At the A/D converter 6, the video signal is sampled at a frequency of 4 fsc to be converted into digital image data (the quantizing number of bits is 8). The image data is written into a field memory 7 in synchronism with a writing clock signal of frequency 4 fsc. The written image data is read out in synchronism with a reading clock signal of frequency 63 KHz. A writing address generator 8 and a reading address generator 9 are connected to the field memory 7 and are arranged to perform the writing and reading actions respectively.

A process for recording one horizontal scanning line portion of still image data in each track as mentioned in the foregoing is as follows: As mentioned above with reference to FIGS. 1(a) to 1(c), the one-horizontal scanning line portion of the still image data consists of 910 words. Therefore, a vacant PCM area is left within each track in which data for 1050 words is recordable. In view of this, the embodiment is arranged to write 70-word portions of data representing "0" both before and after the above stated 910-word still image data. In that instance, a multiplexer (hereinafter referred to as MPX) 10 produces the still picture data "v" and the data "0" by changing them from one over to the other according to a control signal produced from a counter 11.

Figures 3A, 3B:
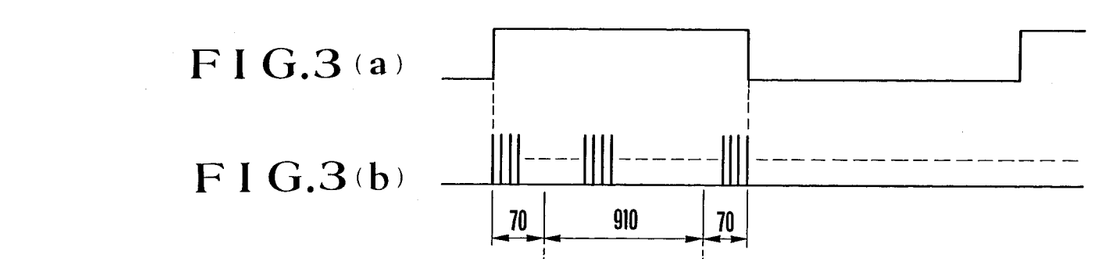
FIGS. 3(a) to 3(c) show in a timing chart the operation of the recording circuit shown in FIG. 2.
Figure 3C:
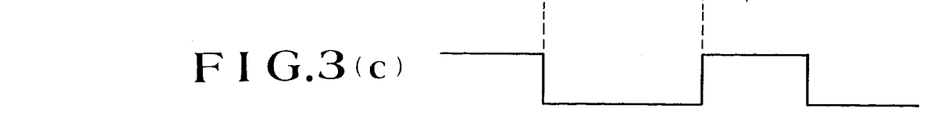

FIGS. 3(a) to 3(c) show in a time chart the operation of the recording circuit shown in FIG. 2. The counter 11 is arranged to receive a 30 PG signal of frequency 30 Hz which is as shown in FIG. 3(a) and also a clock pulse signal of frequency 63 KHz. The count value of the counter 11 is reset every time the 30 PG signal is inverted. The MPX 10 is arranged to select the data "0" when the count value is reset. After resetting, the counter 11 counts the pulses of the clock pulse signal of frequency 63 KHz as shown in FIG. 3(b). The counter 11 produces a control signal at a low (L) level to cause the MPX 10) to select the above stated still image data "v" when its count value reaches 70 and produces the control signal at a high (H) level to cause the MPX 10 to select the other data "0" when its count value reaches 980 as shown in FIG. 3(c). Meanwhile, an analog audio signal is received at an input terminal 13. The audio signal is supplied to an LPF 14 and an A/D converter 15 to be converted into a digital PCM audio data, which is then supplied to the other connecting side B of the switch circuit 3. The connecting position of the switch circuit 3 is arbitrarily changed from one connecting side over to the other according to whether the digital still image data is to be recorded (side A) or the PCM audio data is to be recorded (side B). The output of the switch circuit 3 is supplied to a PCM recorder 12. The data which is thus supplied is written in two memories disposed within the encoder 12. Then, an error correction code, etc. are added to the data in rotation. After the addition, the data is read out to be recorded on a magnetic tape at a recording part 16.

Figure 4:
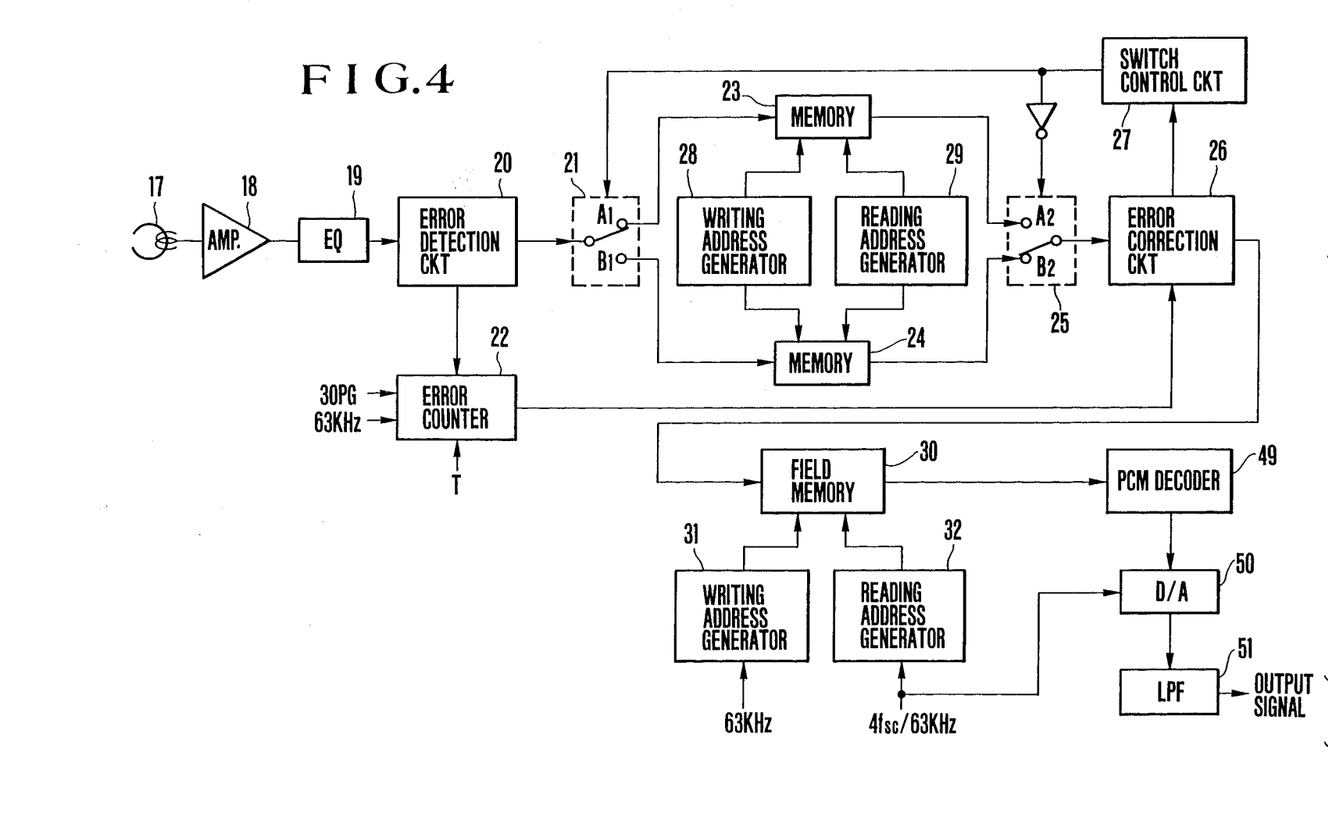
FIG. 4 is a block diagram showing a reproduction circuit corresponding to the recording circuit of FIG. 2.

FIG. 4 shows in a block diagram a reproduction circuit arranged to reproduce the still image data recorded by the recording circuit shown in FIG. 2. The still image data read out from a magnetic tape, which is not shown, by reproducing head 17 is supplied to an error detection circuit 20 via an amplifier 18 and an equalizer (hereinafter referred to as EQ) 19. The error detection circuit 20 supplies the still image data to a switch circuit 21 and also supplies an error counter 22 with an error detection pulse every time a bit error of the data is detected. In case that the number of bit errors is less than a predetermined value, the still image data is allowed to be written in the memories 23 and 24 one after another via the contact point of the switch circuit 21. The still image data written in the memories 23 and 24 are supplied via a switch circuit 25 to an error correction circuit 26. These switch circuits 21 and 25 are both arranged to shift their connecting positions in synchronism with a 30 PG signal coming from a switch control circuit 27. Further, the memories 23 and 24 are respectively connected to a writing address generator 28 and a reading address generator 29. Their writing and reading clock frequencies are both at 63 KHz.

After correction of any correctable error, the error correction circuit 26 supplies the still image data to a field memory 30. The field memory 30 writes in the still image data at a writing address designated by a writing address generator 31. The data written in the field memory is read out from a reading address designated by a reading address generator 32. The still image data read out is supplied to a PCM decoder 49. The decoder 49 separates from the data the error correction code, etc. which have been added by the PCM encoder 12 when the data is recorded. After the decoder 49, the still image data is supplied to a digital-to-analog (hereinafter referred to as D/A) converter 50 to be converted back into an analog still image signal. This signal is produced as a reproduced still image signal via an LPF 51. The clock frequency of the writing address generator 31 is 63 KHz. The clock frequency of the reading address generator 32 is 4 fsc for reproducing the still image data and 63 KHz for reproducing the PCM audio data.

Figure 5A:
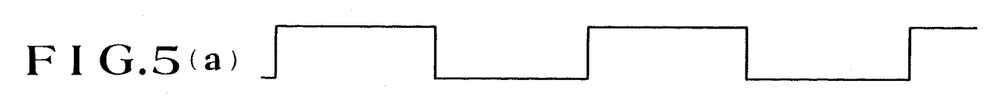
FIG. 5(a) to 5(d) show in a timing chart the operation of the reproduction circuit shown in FIG. 4.
Figure 5B:
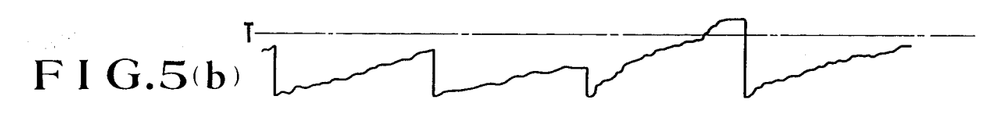
Figure 5C:
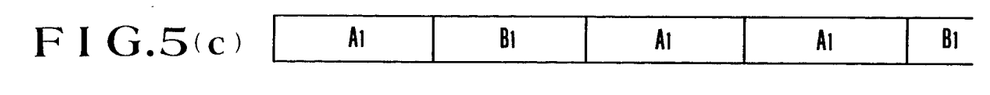
Figure 5D:
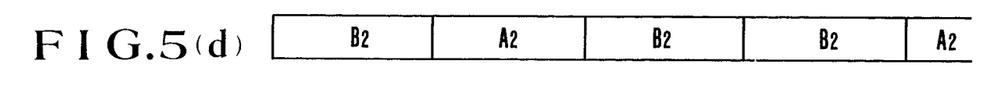

FIGS. 5(a) to 5(d) show in a timing chart the operation of the reproduction circuit shown in FIG. 4. When an error rate exceeding a predetermined rate, or a drop-out, is detected at the error counter 22, this is considered to indicate occurrence of a drop-out and a drop-out compensating action is performed. The details of this are as follows: The 30 PG signal of frequency 30 KHz which is as shown in FIG. 5(a) is supplied to the error counter 22. The error counter 22 which is arranged to be reset every time the 30 PG signal is inverted counts the number of bit errors in synchronism with the clock pulses of 63 KHz. When the number of errors comes to exceed a predetermined value T as shown in FIG. 5(b), a drop-out is determined to have occurred. A detection signal indicative of this drop-out occurrence is supplied to an error correction circuit 26. Upon receipt of this detection signal, the error correction circuit 26 supplies a switch-over stop signal to a switch control circuit 27. Then, as shown in FIGS. 5(c) and 5(d), the switching actions of switch circuits 21 and 25 are suspended during one track reproducing period. Then, in place of a still image data portion recorded in the track in which the drop-out has occurred, another still image data portion recorded in a track immediately preceding the track in question is read out and reproduced. As will be understood from the above description, the drop-out compensation can be simply carried out during reproduction without having recourse to a complex arithmetic operation, etc.

Further, in this specific embodiment, the vacant area in each of the tracks does not have to be located on both end sides of the track but may be located either in front or in rear of the 140-word area within the track. The data to be inserted in the vacant area is also not limited to the data "0". Further, the field memories 7 and 30 which are discretely disposed in the recording and reproduction systems may be replaced with a single memory arranged to be used both for recording and for reproduction.

Figure 6A:
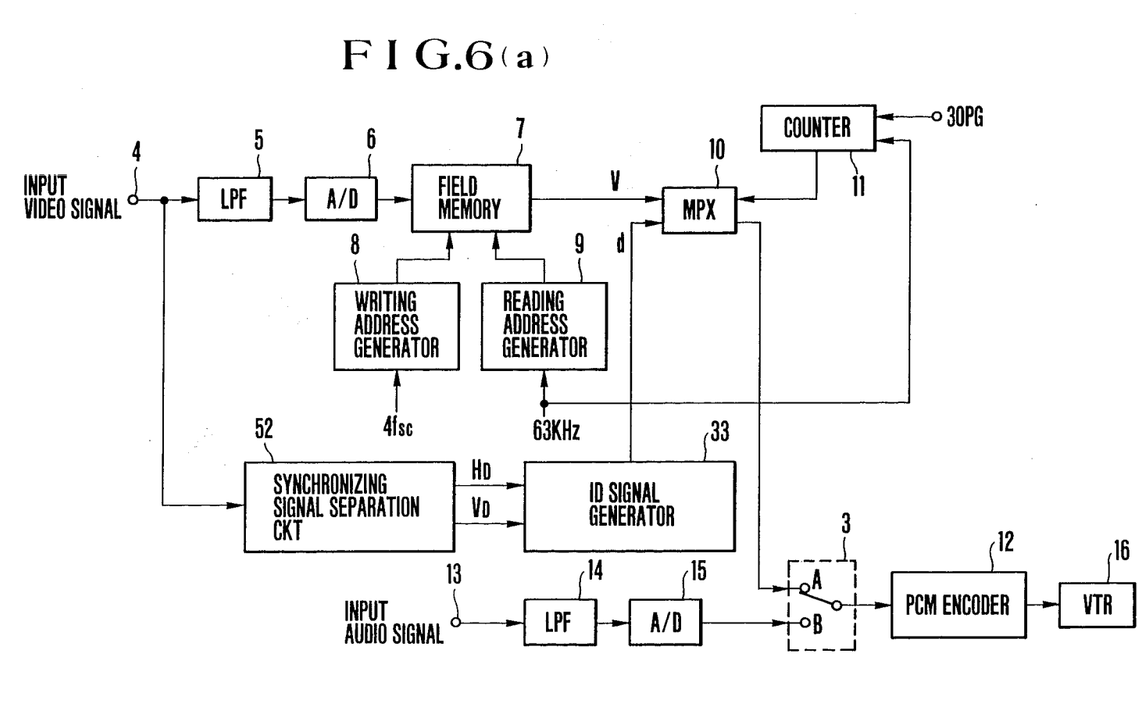
FIGS. 6(a) and 6(b) are block diagrams showing a second embodiment of this invention.
Figure 6B:
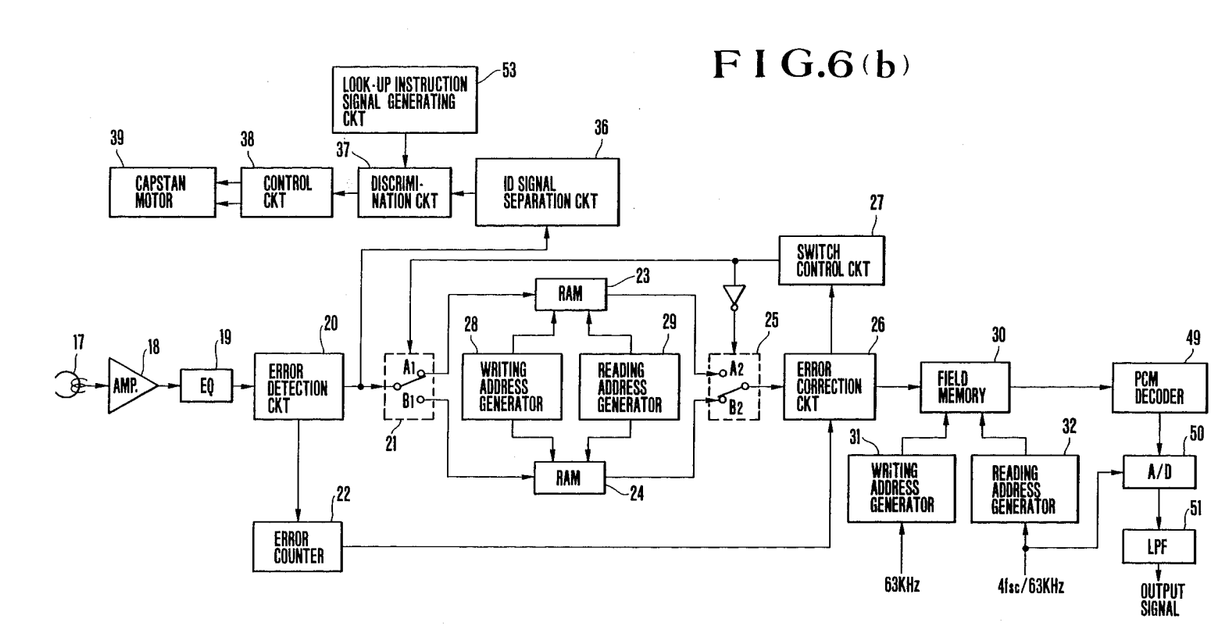

Referring to FIGS. 6(a) and 6(b), a second embodiment of this invention is arranged as follows: FIG. 6(a) shows in a block diagram the recording circuit of the second embodiment and FIG. 6(b) the reproduction circuit thereof. The component parts which are similar to those shown in FIGS. 2 and 4 are indicated by the same reference numerals and details of them are omitted from the description given here. In the case of the second embodiment, a field line identification (hereinafter referred to as ID) signal, instead of the data indicative of "0", is recorded in the vacant area within each track. Like in the case of the first embodiment, in response to the selection signal from the counter 11 the MPX 10 is arranged to selectively produce during recording either the still image data "v" or the ID signal "d" which is obtained from a field line ID signal generator 33. The field line ID signal generator 33 is arranged to receive vertical and horizontal synchronizing signals VD and HD which are separated and produced from a synchronizing signal separation circuit 52. The ID signal or data "d" produced from the generator 33 is arranged to indicate, on the basis of the two different synchronizing signals, a specific horizontal scanning line that corresponds, within a still image, to the one-line portion of the still image data to be recorded in each track. During a reproducing operation, the field line ID signal facilitates identification of the first line of each field.

In looking up a specific part of the still image data by utilizing the field line ID signal, the embodiment operates as follows: Referring to FIG. 6(b), a reproduced signal is obtained from a magnetic tape with the tape driven to travel by a capstan which is not shown. The field line ID signal is separated from the reproduced signal or data by means of a field line ID signal separation circuit 36. The field line ID signal separated is supplied to a discrimination circuit 37. At the circuit 37, the field line ID signal is compared with a look-up instruction signal which corresponds to ID data being looked up and is generated by a look-up instruction signal generating circuit 53 in response to a setting operation performed on a operation part which is not shown. Then, a capstan motor 39 is controlled by a motor control circuit 38 according to the degree of error or difference found through the comparison. The traveling speed of the magnetic tape is adjusted according to the error or difference, so that the length of time required for the look-up operation can be shortened. In the event of making compensation for a drop-out which takes place during the process of reproducing the frame recorded still image data, the embodiment operates as follows: The reproduced still image data is stored by a memory or the like. The stored still image data is read out by using the above stated field line ID signal. Then, the drop-out can be compensated for by utilizing a correlation between one field and another.

Figure 7A:
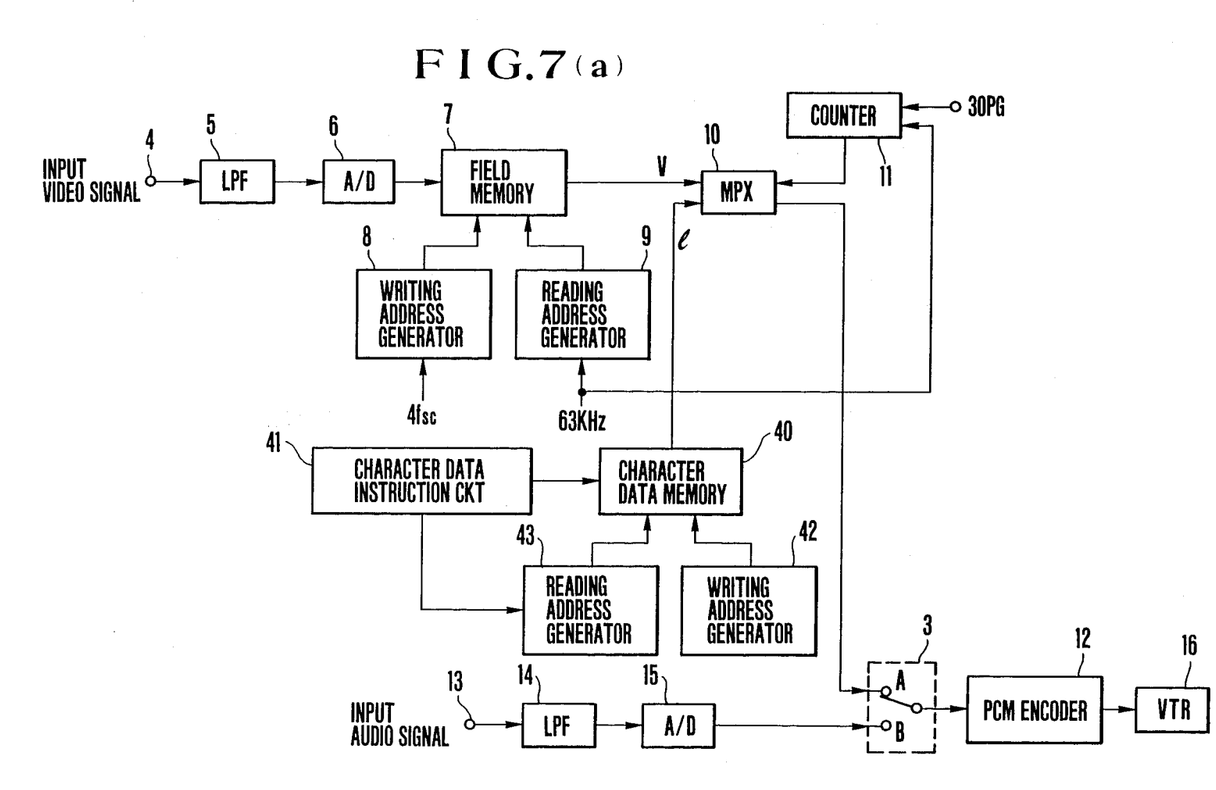
FIGS. 7(a) and 7(b) are block diagrams showing a third embodiment of this invention.
Figure 7B:
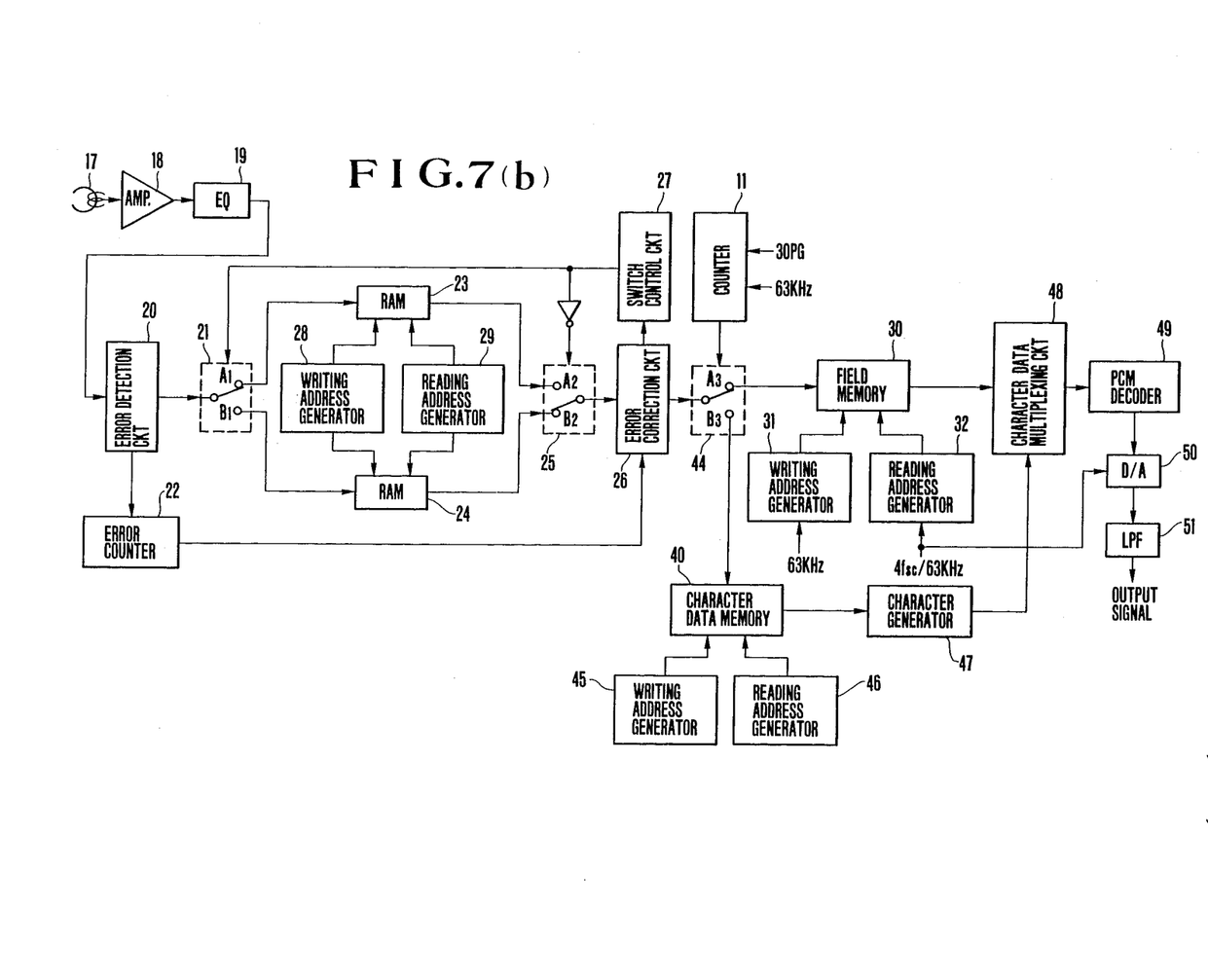

FIGS. 7(a) and 7(b) show in block diagrams the recording and reproduction circuits of a third embodiment of this invention. The third embodiment is provided with a character data memory 40 which is arranged to store therein character data to be recorded in the vacant area of each track. During recording, an MPX 10 selectively produces either still image data "v" or character data "l" in accordance with a selection signal produced from a counter 11. The character data memory 40 is connected to a character data instruction circuit 41, a writing address generator 42 and a reading address generator 43. The character data is thus arranged to be read out with an address of the character data on the memory 40 designated at the operation part which is not shown but is included in the character data instruction circuit 41. An ASCII code or the like may be employed as the character data. It is also possible to have a Chinese character displayed by using some character code that is used for a Japanese word processor or the like.

In carrying out reproduction, one of the contact points A3 or B3 of a switch circuit 44 is selected, like in the case of recording, according to the selection signal produced from the counter 11. Reproduced data is written in a field memory 30 and the character data memory 40 respectively. To the character data memory 40 are also connected a writing address generator 45 and a reading address generator 46. The output of the memory 40 is supplied via a character generator 47 to a character data multiplexing circuit 48. The character data is thus multiplexed with the still image data. The multiplex data thus obtained is produced after undergoing the same processes performed as in the case of FIG. 4 by a PCM decoder 49, a D/A converter 50 and an LPF 51. In this case, it is also possible to record audio data in place of the character data and to perform reproduction by converting the reproduced audio data into an audio signal by means of an audio signal circuit, etc.

While the embodiments of this invention have been described as arranged in varied manners in the foregoing, it goes without saying that they may be arranged in suitable combinations. In all such cases, drop-out compensating operation can be easily accomplished.

In the embodiments described, one horizontal scanning line portion of the PCM image data which is eight-bit quantized per sample is arranged to be recorded in one track. However, this invention is not limited to this arrangement. In accordance with the invention, several horizontal scanning line portions of the image data are recordable in each track by performing band compression according to the DPCM method or the like. In that instance, for the drop-out compensation to be carried out during a reproducing operation, it is preferable to record, within one track, image data portions which correspond to ten horizontal scanning lines or thereabout and have a relatively high degree of correlativity, because: Such recording arrangement effectively prevents reproduced picture quality from being saliently deteriorated by drop-out compensation in the event of occurrence of a drop-out. Further, in another possible modification, one horizontal scanning line portion of image data may be recorded in several tracks. The modification to such a degree also permits easy drop-out compensation without necessitating any complex arrangement.

What is claimed is:

1. An image signal recording apparatus selectively recording, on a recording medium, an image signal or a digitized audio signal, said image signal corresponding to a still image consisting of a plurality of horizontal scanning lines and consisting of a plurality of horizontal scanning line information signals which correspond to said horizontal scnning lines, comprising
    (a) a converting means arranged to feed said image signal to the unit of said horizontal scanning line information signals, to digitize the fed horizontal scanning line information signals, and to output said digitized signals as horizontal scanning line information data;
    (b) storing means for temporarily storing said horizontal scanning line information data produced from said converting means, in which said horizontal scanning line information data produced by said converting means are serially stored by said storing means in synchronism with a first clock signal, and said horizontal scanning line information data stored by aid storing means are outputted in synchronism with a second clock signal which is of a different frequency from the frequency of said first clock signal; and
    (c) recording means arranged to form a n number (n: an integer which is at least one) of recording tracks on said recording medium by recording on said medium said horizontal scanning line information data which corresponds to an m number (m: an integer which can be expressed as $1 \leq m \leq 10$) of horizontal scanning lines produced by said converting means.

2. An image signal recording apparatus selectively recording, on a recording medium, an image signal or a digitized audio signal, said imager signal corresponding to a still image consisting of a plurality of horizontal scanning lines and consisting of a plurality of horiozntal scanning line information signals which correspond to said horizontal scanning lines, comprising:
    (a) converting means arranged to feed said image signal to the unit of said horizontal scanning line information signals, to digitize the fed horizontal scanning line information signals, and to output said digitized signals as horizontal scanning line information data;
    (b) recording means arranged to form a single recording track on said recording medium by recording on said medium said horizontal scanning line information data which corresponds to an m number (m: an integer which can be expressed as $1 \leq m \leq 10$) of horizontal scanning lines produced by said converting means or by recording said digitized audio signal; and
    (c) supply means for supplying said recording means selectively with said horizontal scanning line information data which corresponds to said m number of horizontal scanning lines produced by said converting means or with said digitized audio signal.

3. An apparatus according to claim 2, wherein said converting means is arranged to convert one horizontal scanning line portion of said horizontal scanning line information signals into horizontal scanning line information data consisting of a number of bits less than a number of bits included in said digitized audio signal to be recorded in each of recording tracks on said medium.

4. An apparatus according to claim 3, further comprising first data adding means which is arranged to add first data which differs from said horizontal scanning line information data to said horizontal scanning line information data.

5. An apparatus according to claim 4, wherein said first data adding means includes:
   (a) a first data generating circuit which is arranged to generate said first data;
   (b) a time-division multiplex circuit which is arranged to receive said horizontal scanning line information data produced from said converting means and also said first data produced from said first data generating circuit and to multiplex said horizontal scanning line information data and said first data in a time sharing manner; and
   (c) a count circuit which is arranged to count the pulses of a clock signal every time one of recording tracks is formed on said recording medium and selectively produce said horizontal scanning line information data or said first data according to a count value thus obtained.

6. An apparatus according to claim 4, wherein said first data adding means is arranged to add to said horizontal scanning line information data said first data in a state of a data train consisting of data which consecutively denote "0".

7. An apparatus according to claim 4, wherein said first data adding means is arranged to add to said horizontal scanning line information data said first data in a state of indexing data which denotes to which of the horizontal scanning lines of said still image said horizontal scanning line information data corresponds.

8. An apparatus according to claim 4, wherein said first data adding means is arranged to add to said horizontal scanning line information data said first data in a state of character information data 9. An apparatus according to claim 4, wherein said first data adding means is arranged to add to said horizontal scanning line information data said first data in a state of audio information data.

10. An image signal recording and/or reproducing apparatus, recording and/or reproducing, on or from a recording medium, an image signal which corresponds to a still image consisting of a plurality of horizontal scanning lines and which consists of a plurality of horizontal scanning line information signals corresponding to said horizontal scanning lines, comprising:
   (a) converting means to receive said image signal by the unit of horizontal scanning line information signals, to digitize said horizontal scanning line information signals and to produce said digitized signals as horizontal scanning line information data;
   (b) recording means arranged to form an n number (n: an integer which is at least one) of recording tracks on said recording medium by recording on said medium said horizontal scanning line information data which corresponds to an m number (m: an integer which can be expressed as $1 \leq m \leq 10$) of horizontal scanning lines and is produced from said converting means;
   (c) reproducing means for reproducing from said recording medium said horizontal scanning line information data recorded on said medium;
   (d) error rate detecting means arranged to detect whether or not each portion of said horizontal scanning line information data which corresponds to one horizontal scanning line and is reproduced by said reproducing means has an error rate reaching a predetermined error rate;
   (e) storing means for storing every horizontal scanning line portion of said horizontal scanning line information data reproduced by said reproducing means;
   (f) output means arranged such that, when the error rate of said horizontal scanning line portion of said horizontal scanning line information data reproduced by said reproducing means is detected and determined by said error rate detecting means to have reached said predetermined rate of error, said output means produces a previous horizontal scanning line information data portion which is stored at said storing means and has a lesser rate of error than said predetermined rate;
   (g) error correcting means arranged to correct said horizontal scanning line information data produced from said output means and to produce corrected data; and
   (h) restoring means arranged to reproduce said image signal in its original state from said horizontal scanning line information data produced from said error correcting means.

11. An apparatus according to claim 10, further comprising first data adding means arranged to add, to said horizontal line information data produced from said converting means, first data which differs from said horizontal line information data and to supply said recording means with said horizontal scanning line information data with said first data added thereto.

12. An apparatus according to claim 11, wherein said first data adding means is arranged to add said first data to said horizontal scanning line information data in a state of a data train consisting of data which consecutively denote "0".

13. An apparatus according to claim 11, wherein said first data adding means is arranged to add said first data to said horizontal scanning line information data in a state of indexing data which denotes to which of said horizontal scanning lines of said still image said horizontal scanning line information data corresponds.

14. An apparatus according to claim 13, wherein said reproducing means is arranged to reproduce, from said recording medium, information data recorded on said recording medium; and said reproducing means includes an index data separating circuit which is arranged to separate said indexing data from said information data.

15. An apparatus according to claim 14, further comprising:
   (a) look-up object data generating means for generating look-up object data corresponding to the indexing data included in specific horizontal scanning line information data to be searched out from among a plurality of said horizontal scanning line information data recorded on said recording medium; and
   (b) look-up means arranged to receive indexing data separated by said index data separating circuit and said look-up object data generated by said look-up object data generating means and to perform a look-up action on said horizontal scanning line information data recorded on said recording medium by using said look-up object data and said indexing data.

16. An apparatus according to claim 15, wherein said look-up object data generating means is arranged to generate look-up object data corresponding to the indexing data included in specific horizontal scanning line information data in which a drop-out occurs among horizontal scanning line information data corresponding to another still image.

17. An apparatus according to claim 11, wherein said first data adding means is arranged to add, to said horizontal scanning line information data, said first data in the form of character information data.

18. An apparatus according to claim 17, further comprising:
   (a) character information data separating means for separating, from said horizontal scanning line information data, said character information data added to said horizontal scanning line information data which is produced from said error correcting means;
   (b) character generating means which has character data of a plurality of kinds and is arranged to produce character data corresponding to said character information data separated by said character data separating means; and
   (c) character data multiplexing means arranged to multiplex the horizontal scanning line information data from which said character information data has been separed by said character informaton data separating means with said character data which is generated by said character data generating means and to supply said horizontal scanning line information data to said restoring means with said character data multiplexed therewith.

* * * * *